(12) United States Patent
Talmor et al.

(10) Patent No.: US 9,553,845 B1
(45) Date of Patent: Jan. 24, 2017

(54) METHODS FOR VALIDATING AND TESTING FIREWALLS AND DEVICES THEREOF

(71) Applicant: F5 Networks, Inc., Seattle, WA (US)

(72) Inventors: Ron Talmor, Sunnyvale, CA (US); John N. Nugent, Mountain View, CA (US); JC Ferguson, Harvard, MA (US)

(73) Assignee: F5 Networks, Inc., Seattle, WA (US)

( * ) Notice: Subject to any disclaimer, the term of this patent is extended or adjusted under 35 U.S.C. 154(b) by 49 days.

(21) Appl. No.: 14/502,585

(22) Filed: Sep. 30, 2014

Related U.S. Application Data

(60) Provisional application No. 61/884,736, filed on Sep. 30, 2013.

(51) Int. Cl.
*H04L 29/06* (2006.01)
(52) U.S. Cl.
CPC ....... *H04L 63/0263* (2013.01); *H04L 63/1433* (2013.01)
(58) Field of Classification Search
CPC ....... H04L 63/02; H04L 63/20; H04L 63/0281
See application file for complete search history.

(56) References Cited

U.S. PATENT DOCUMENTS 8,117,640 B1    2/2012   Moriconi et al.

FOREIGN PATENT DOCUMENTS

GB       EP 2782311 A1 *  9/2014  ............. H04L 63/02

OTHER PUBLICATIONS

F5 Networks, Inc., "Big-IP Network Firewall: Policies and Implementations," Version 11.4, pp. 3-6, 17, 61-67, and 69-70 (May 2013).
F5 Networks, Inc., "Big-IP Network Firewall: Policies and Implementations," Version 11.3, pp. 3-6, 8, 33-34, 40-41, 44, 52-55, and 57 (Nov. 2012).
F5 Networks, Inc., "Big-IP Policy Enforcement Manager: Implementations," Version 11.4, pp. 1-96 (May 2013).

* cited by examiner

*Primary Examiner* — Izunna Okeke
(74) *Attorney, Agent, or Firm* — LeClairRyan, a Professional Corporation

(57) ABSTRACT

A method, non-transitory computer readable medium, and traffic management computing device that obtains one or more parameters for a packet. Firewall policies each corresponding to a logical firewall are applied to the parameters for the packet. A policy log for each of at least a subset of the firewall policies or a hit count for one or more of rules in an access list of each of the subset of the firewall policies is generated. The policy log includes an indication of one or more actions corresponding to at least one rule in the access list of each of the subset of the firewall policies, wherein the at least one rule matches one or more of the parameters of the packet. At least one of the generated policy log or hit counts for one or more of the at least a subset of the firewall policies is output.

21 Claims, 5 Drawing Sheets

METHODS FOR VALIDATING AND TESTING FIREWALLS AND DEVICES THEREOF

This application claims the benefit of U.S. Provisional Patent Application No. 61/884,736, filed on Sep. 30, 2013, which is hereby incorporated by reference in its entirety.

FIELD

This technology generally relates to methods and devices for managing network security and, more specifically, to testing and validating firewall policies.

BACKGROUND

Many computer networks include firewalls as standalone devices or as a module of a traffic management or other network device capable of providing additional services. Traffic management computing devices including firewall functionality can be configured to provide services, such as accelerating, optimizing, and/or load balancing network traffic exchanged between client computing devices and the server computing devices, for example. Traffic management computing devices can implement firewalls in order to restrict unauthorized and/or malicious network traffic from accessing network resources.

Accordingly, firewall administrators deploy firewall policies on the traffic management computing devices, which are often very complicated and include a significant number of rules for analyzing network traffic. Based on the analysis, an action corresponding to a matching one of the rules is taken for a packet. The actions generally include allowing the packet to proceed to the destination, allowing the packet to be analyzed by a next firewall policy in a different context, or denying the packet. Over time, there is generally a need to update or modify a deployed firewall policy.

However, currently there is no efficient way for a firewall administrator to determine the effect of a policy change prior to deploying a new or modified policy. Due to the complexity of the policies, one change may have unintended consequences on other policies or the network traffic. Accordingly, firewall administrators often deploy a new or modified policy and then roll it back and replace it with a prior policy when an issue arises in a live environment. This type of validation process is often disruptive for users and is inefficient for firewall administrators. Additionally, currently there is no effective way for a firewall administrator to test or visualize the operation of a firewall having many firewall policies in various contexts.

SUMMARY

A method for testing a firewall includes obtaining, by a traffic management computing device, one or more parameters for a packet. Firewall policies each corresponding to a logical firewall are applied, by the traffic management computing device, to the parameters for the packet. A policy log for each of at least a subset of the firewall policies or a hit count for one or more of rules in an access list of each of the subset of the firewall policies is generated by the traffic management computing device. The policy log includes an indication of one or more actions corresponding to at least one rule in the access list of each of the subset of the firewall policies, wherein the at least one rule matches one or more of the parameters of the packet. At least one of the generated policy log or hit counts for one or more of the at least a subset of the firewall policies is output by the traffic management computing device.

A traffic management computing device includes a processor and a memory coupled to the processor which is configured to be capable of executing programmed instructions comprising and stored in the memory to obtain one or more parameters for a packet. Firewall policies each corresponding to a logical firewall are applied to the parameters for the packet. A policy log for each of at least a subset of the firewall policies or a hit count for one or more of rules in an access list of each of the subset of the firewall policies is generated. The policy log includes an indication of one or more actions corresponding to at least one rule in the access list of each of the subset of the firewall policies, wherein the at least one rule matches one or more of the parameters of the packet. At least one of the generated policy log or hit counts for one or more of the at least a subset of the firewall policies is output.

A non-transitory computer readable medium having stored thereon instructions for testing a firewall includes executable code which when executed by a processor, causes the processor to perform steps including obtaining one or more parameters for a packet. Firewall policies each corresponding to a logical firewall are applied to the parameters for the packet. A policy log for each of at least a subset of the firewall policies or a hit count for one or more of rules in an access list of each of the subset of the firewall policies is generated. The policy log includes an indication of one or more actions corresponding to at least one rule in the access list of each of the subset of the firewall policies, wherein the at least one rule matches one or more of the parameters of the packet. At least one of the generated policy log or hit counts for one or more of the at least a subset of the firewall policies is output.

This technology provides a number of advantages including providing more efficient and effective methods, non-transitory computer readable media, and devices for testing and validating network firewall policies. With this technology, firewall policies can be staged and testing in a live environment prior to being deployed as an enforced firewall policy in the environment. Accordingly, firewall administrators can more effectively test and validate firewall policies, thereby reducing the need to roll back deployed policies as well the associated user disruption. Additionally, firewall administrators can visualize the application of a firewall policy in a simulated environment in order to determine whether the policy is in condition for deployment or to more effectively troubleshoot a deployed policy.

DETAILED DESCRIPTION

Figure 1:
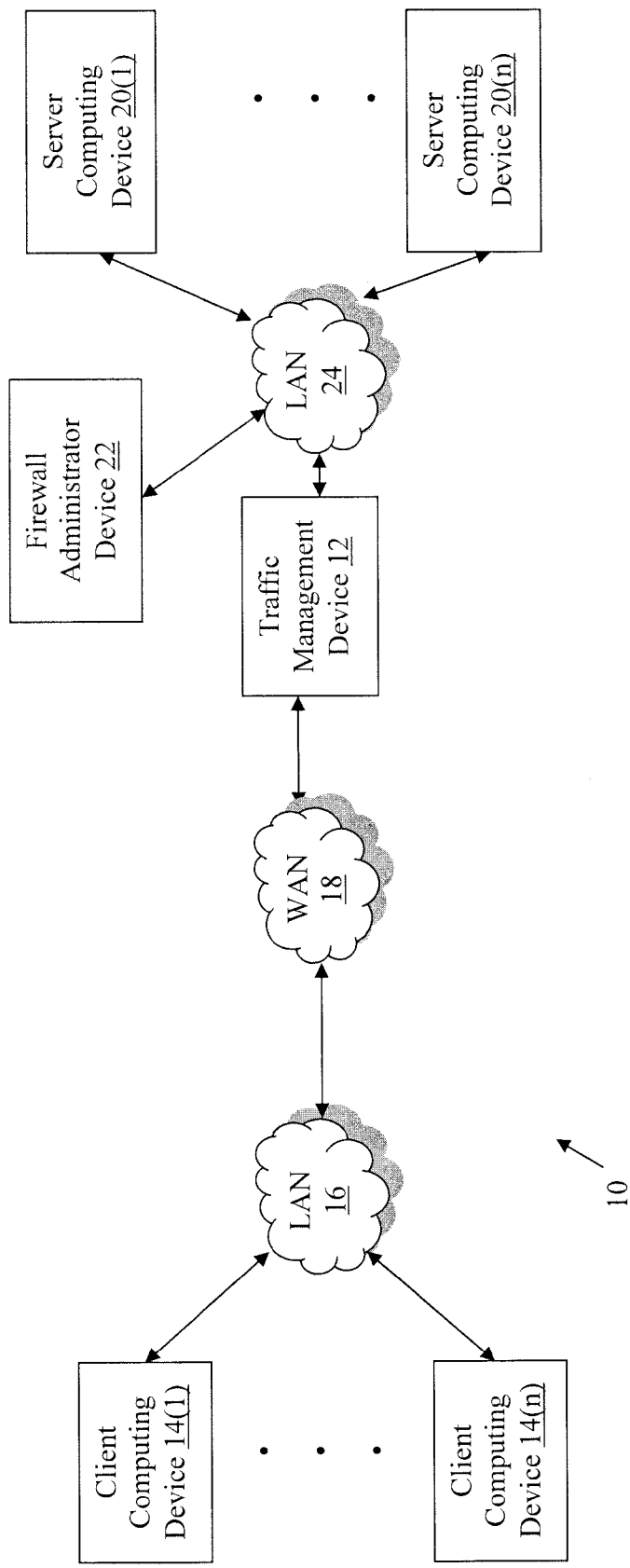
FIG. 1 is a block diagram of an network environment with an exemplary traffic management computing device.

Referring to FIG. 1, a block diagram of an exemplary network environment 10 including an exemplary traffic management computing device 12 configured to implement firewall functionality is illustrated. In this example, the traffic management computing device 12 is coupled to a plurality of client computing devices 14(1)-14(n) through a LAN 16 and a WAN 18 and a plurality of server computing devices 20(1)-20(n) and a firewall administrator device 22 through another LAN 24, although the traffic management computing device 12, client computing devices 14(1)-14(n), server computing devices 20(1)-20(n), and firewall administrator device 22 may be coupled together via other topologies. The network environment 10 may also include other network devices such as one or more routers and/or switches, for example. Additionally, the traffic management computing device 12 implementing firewall functionality can be deployed in any number of locations in a network environment and can be configured to filter network traffic exchanged between any number and type of network devices or resources. This technology provides a number of advantages including methods, non-transitory computer readable medium, and devices that facilitate relatively efficient validation and testing of firewall policies.

Figure 2:
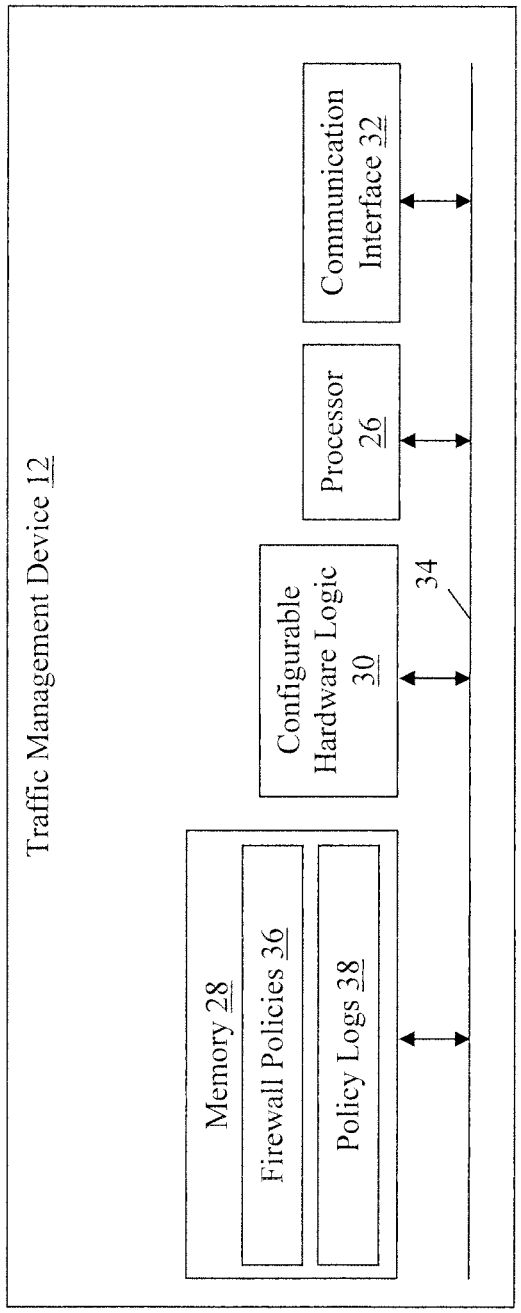
FIG. 2 is a block diagram of the exemplary traffic management computing device illustrated in FIG. 1.

Referring to FIGS. 1-2, the traffic management computing device 12 may perform any number of functions in addition to implementing firewall policies, such as optionally optimizing, securing, and/or load balancing the network traffic exchanged between the client computing devices 14(1)-14(n) and the server computing devices 20(1)-20(n), for example. The traffic management computing device 12 in this example includes a processor 26, a memory 28, optional configurable hardware logic 30, and a communication interface 32 which are coupled together by a bus 34 or other communication link, although the traffic management computing device 12 may include other types and numbers of elements in other configurations.

The processor 26 of the traffic management computing device 12 may execute one or more programmed instructions for the any number of functions described herein for validating and testing firewall policies and, optionally, managing network traffic and/or optimizing service of resource requests, for example. The processor 26 of the traffic management computing device 12 may include one or more central processing units and/or general purpose processors with one or more processing cores, for example.

The memory 28 of the traffic management computing device 12 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk, solid state storage device(s), or other computer readable medium which is read from and written to by a magnetic, optical, or other reading and writing system that is coupled to the processor 26, can be used for the memory 28.

In this example, the memory 28 includes a plurality of firewall policies 36 includes at least an enforced firewall policy, a staged firewall policy, and a plurality of other firewall policies each corresponding to a logical firewall associated with one of a plurality of contexts, as described and illustrated in more detail later. Any number of the firewall policies 36 can be shared among various virtual Internet Protocol VIP) addresses. Other types and numbers of firewall policies could also be included in the firewall policies 36 in other examples. Additionally, the memory 28 in this example includes policy logs 38 used to store indications of rules implicated by the application of one or more of the firewall policies 36 to live network traffic and/or to packet parameters of simulated network traffic, for example, as described and illustrated in more detail later.

The optional configurable hardware logic 30 of the traffic management computing device 12 may comprise specialized hardware configured to implement one or more steps of this technology as illustrated and described with reference to the examples herein. By way of example only, the optional configurable logic 30 may comprise one or more of field programmable gate arrays (FPGAs), field programmable logic devices (FPLDs), application specific integrated circuits (ASICs) and/or programmable logic units (PLUs).

The communication interface 32 operatively couples and communicates between the traffic management computing device 12, the client computing devices 14(1)-14(n), server computing devices 20(1)-20(n), and firewall administrator device 22, which are all coupled together by the LANs 16 and 24 and the WAN 18, although other types and numbers of communication networks or systems with other types and numbers of connections and configurations to other devices and elements. By way of example only, the LANs 16 and 24 and the WAN 18 can use TCP/IP over Ethernet and industry-standard protocols, including NFS, CIFS, SOAP, XML, LDAP, and SNMP, although other types and numbers of communication networks, can be used.

The LANs 16 and 24 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client computing devices 14(1)-14(n) includes a processor, a memory, an input device, a display device, and a communication interface, which are coupled together by a bus or other communication link, although other numbers and types of network devices could be used. The client computing devices 14(1)-14(n) may run interface applications, such as Web browsers, that may provide an interface to make requests for and receive content associated with applications hosted by the server computing devices 20(1)-20(n) via the LANs 16 and 24 and/or the WAN 18, for example.

Each of the server computing devices 20(1)-20(n) includes a processor, a memory, and a communication interface, which are coupled together by a bus or other communication link, although other numbers and types of network devices could be used. The server computing devices 20(1)-20(n) may provide content or other network resources in response to requests directed toward the respective applications hosted by the server computing devices 20(1)-20(n) from the client computing devices 14(1)-14(n) via the LANs 16 and 24 and/or the WAN 18 according to the HTTP-based application RFC protocol or the CIFS or NFS protocol, for example.

The server computing devices 20(1)-20(n) may be hardware or software or may represent a system with multiple server computing devices in a server computing device pool, which may include internal or external networks. Various network processing applications, such as CIFS applications, NFS applications, HTTP Web Server computing device applications, and/or FTP applications, may be operating on the server computing devices 20(1)-20(n) and transmitting data (e.g., files or web pages) in response to requests from the client computing devices 14(1)-14(n).

The firewall administrator device 22 includes a processor, a memory, a communication interface, an input device, and a display device, which are coupled together by a bus or other communication link. A user of the firewall administrator device 22 may communicate with the traffic management computing device 12 over the LAN 24 and via a provided interface to deploy and/or modify the firewall policies 36 on the traffic management computing device 12, although the firewall policies 36 can also be deployed and/or modified in other ways.

Although the exemplary network environment with the traffic management computing device 12, client computing devices 14(1)-14(n), server computing devices 20(1)-20(n), firewall administrator device 22, LANs 16 and 24, and WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
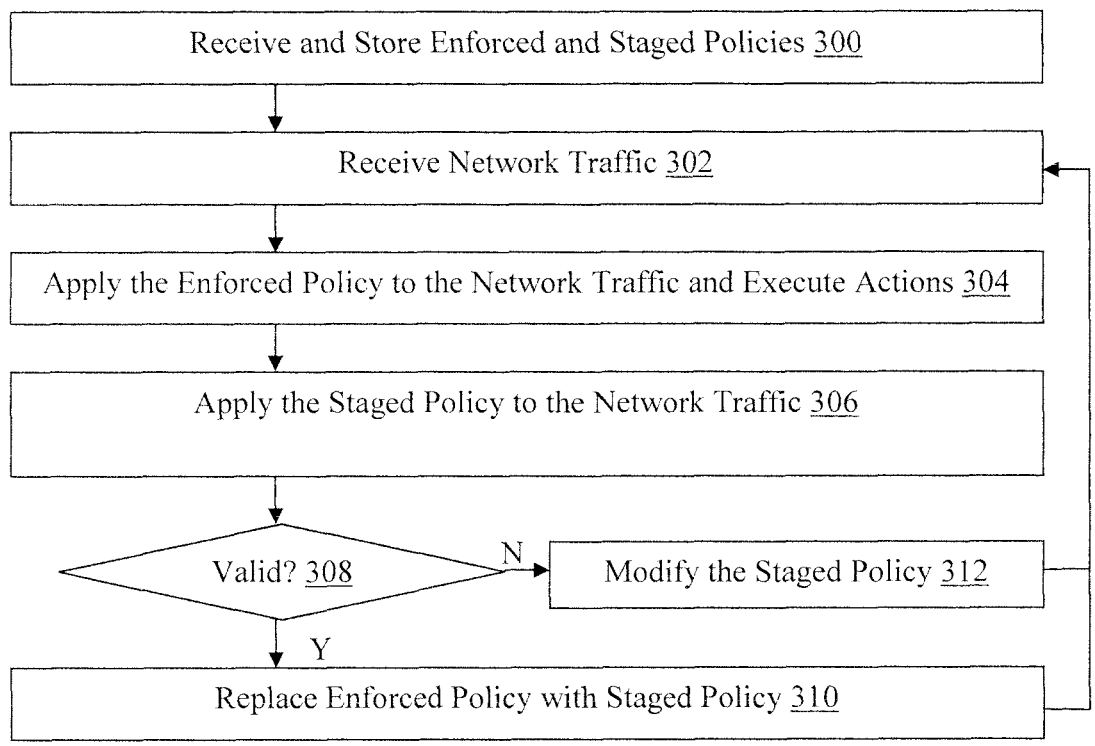
FIG. 3 is a flowchart of an exemplary method for testing and validating firewall policies in a live environment.

An exemplary method for validating firewalls will now be described with reference to FIGS. 1-4. Referring more specifically to FIG. 3, a flowchart of an exemplary method for testing and validating firewall policies in a live environment is illustrated. In step 300 in this example, the traffic management computing device 12 receives, and stores in the memory 28, at least one enforced firewall policy and at least one staged firewall policy. The enforced and staged firewall policies include one or more respective access lists, which include one or more rules and at least one action associated with each of the rules. Generally, the enforced firewall policy is an established or currently deployed firewall policy and the staged firewall policy is a new policy and/or a modified version of the enforced firewall policy to be deployed.

The enforced and staged firewall policies can be received from a user of the firewall administrator device 22, for example, although the firewall policies can also be deployed to the traffic management computing device 12 in other ways. In one example, the traffic management computing device 12 is configured to generate the staged firewall policy by cloning the enforced firewall policy and modifying the cloned enforced firewall policy based on changes to the enforced firewall policy received from a user of the firewall administrator device 22 via a provided interface. Accordingly, the staged firewall policy can be received subsequent to the enforced firewall policy and the traffic management computing device 12 can process network traffic, such as described and illustrated in more detail later with reference to step 304, based on the enforced firewall policy before any staged firewall policy is deployed.

Figure 4:
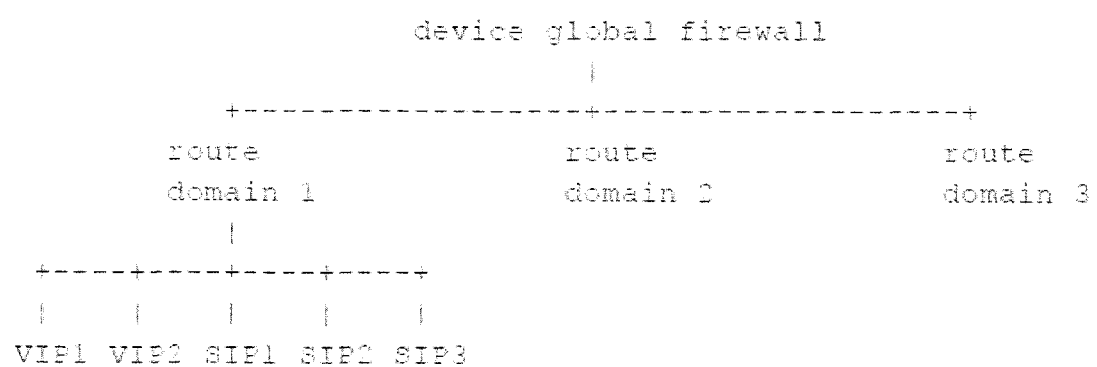
FIG. 4 is a diagram of exemplary contexts corresponding to logical firewalls in a network environment.

Referring more specifically to FIG. 4, a diagram of exemplary contexts corresponding to logical firewalls in a network environment is illustrated. In this example, the received and stored enforced and staged firewall policies can be associated with any number of logical firewalls corresponding to different contexts, such as global, route domain, virtual server, and/or self IP address contexts for example. Accordingly, network traffic received by the traffic management computing device 12 may be subject to a firewall policy for any number of contexts, which optionally correspond to a hierarchical organization.

Referring back to FIG. 3, in step 302, the traffic management computing device 12 receives network traffic including a plurality of packets, such as from the client computing devices 14(1)-14(n), for example. Each of the packets includes a plurality of parameters such as source and destination IP addresses, source and destination port numbers, an indication of an associated protocol, and/or an indication of a source virtual LAN, for example, although other types and numbers of parameters could be included in the received packets. The parameters can be included in headers and/or the payloads of each of the received packets, for example.

In step 304, the traffic management computing device 12 applies the enforced firewall policy to the network traffic and executes any resulting actions on the network traffic. In order to apply the enforced firewall policy, the traffic management computing device 12 compares one or more of the parameters of each of the packets to the rules of the access list of the enforced firewall policy. Upon identifying a first matching rule for each of the packets, based on the associated parameters, the action associated with that rule in the access list is executed. The traffic management computing device 12 optionally outputs the executed actions, and optionally the parameter(s) of each respective packet matching those of the first matching rule, to an enforced firewall policy log stored in the memory 28.

Generally, the action will be to allow a packet to proceed to a next logical firewall corresponding to a different context, allow the packet to proceed directly to the destination, or deny the packet. In this example, the enforced firewall policy is associated with a logical firewall corresponding to a global context, although the enforced firewall policy can be associated with any other logical firewall. While incoming network traffic is processed by a logical firewall corresponding to the global context, a subset of the network traffic may be processed by other logical firewalls, according to actions taken with respect to matching rules.

In step 306, the traffic management computing device 12 applies the staged firewall policy to the network traffic. In one example, the traffic management computing device 12 outputs an indication of any resulting actions on the network traffic to a staged firewall policy log stored in the memory 28. Although the enforced firewall policy can be associated with any number of logical firewalls, as described and illustrated earlier, the staged firewall policy is associated with the same logical firewall as the enforced firewall policy applied in step 304. In order to apply the staged firewall policy, the traffic management computing device 12 compares one or more of the parameters of each of the packets to the rules of the access list of the staged firewall policy. Upon identifying a first matching rule for each of the packets based on the respective parameters, an indication of the action associated with that rule in the access list is output to a staged policy log in the memory 28.

Generally, the possible actions associated with rules in the access list of the staged firewall policy will be substantially the same as those associated with rules in the access list of the enforced firewall policy. However, whereas the action associated with a matching rule for each packet is executed during application of the enforced firewall policy, the action associated with a matching rule for each packet is not executed during application of the staged firewall policy. Instead, an indication of the action is output by the traffic management computing device 12 to the staged policy log during application of the staged firewall policy. Optionally, the traffic management computing device 12 is further configured to output the parameters of each of the packets matching those of the first matching rule in the access list of the staged firewall policy, along with the indication of corresponding action, to the staged policy log in the memory 28.

Optionally, the traffic management computing device 12 also maintains a hit count for each of the rules in the access list of one or more of the enforced and/or staged firewall policy to which the obtained parameters were compared during the application of the staged firewall policy in step 306. The access list for each of the enforced and staged firewall policies is traversed in order and each rule is compared to the obtained parameters for each packet to identify a match. Accordingly, the hit count value for a rule can be incremented each time the rule is compared and/or determined to be a match for the parameters of each of the packets. The hit count values for each rule are optionally included in the generated log or otherwise stored by the traffic management computing device 12 in the memory 28.

In step 308, the traffic management computing device 12 determines whether the staged firewall policy is valid based on the staged policy log. In one example, the staged policy log, and optionally the enforced policy log, can be sent by the traffic management computing device 12 to the user of the firewall administrator device 22 automatically or upon request. Optionally, differences between the staged and enforced policy logs can be identified and highlighted by the traffic management computing device 22 prior to sending the log(s) to the firewall administrator device 22. In response, the user of the firewall administrator device 22 can indicate to the traffic management computing device 12 whether the staged firewall policy is valid.

In another example, the staged policy log can be automatically compared to the enforced policy log to identify differences and determine whether the differences represent desired functionality of the logical firewall, such as based on a set of rules provided by the user of the firewall administrator device 22, for example. In yet another example, the maintained hit count can be provided to an administrator of the traffic management computing device 12, optionally to be compared with a hit count maintained for the enforced firewall policy. Other methods of determining whether the staged firewall policy is valid can also be used. If the traffic management computing device 12 determines that the staged firewall policy is valid, then the Yes branch is taken to step 310.

In step 310, the traffic management computing device 12 replaces the enforced firewall policy with the staged firewall policy. Optionally, the previously-enforced firewall policy can be discarded or retained in the memory 28 for subsequent reuse, if necessary. Subsequent to replacing the enforced firewall policy with the staged firewall policy, network traffic can continue to be received in step 302, as described and illustrated earlier. Referring back to step 308, if the traffic management computing device 12 determines that the staged firewall policy is not valid, then the No branch is taken to step 312.

In step 312, the traffic management computing device 12 modifies the staged firewall policy, such as by modifying the access list of the staged firewall policy to address the issues that resulted in the invalidity determination in step 308. The traffic management computing device 12 can modify the staged firewall policy based on input received from a user of the firewall administrator device 22 via a provided interface, for example, although other methods of modifying the staged firewall policy can also be used. Additionally, a new staged firewall policy can also be provided or the staged firewall policy can be discarded entirely and the traffic management computing device 12 can continue applying the enforced firewall policy to received network traffic.

In this example, subsequent to modifying the staged firewall policy, the traffic management computing device 12 proceeds to repeat steps 302-308 in an attempt to validate the modified staged firewall policy. One or more of the steps illustrated in FIG. 4 can operate in parallel for any set of an enforced firewall policy and a staged firewall policy. For example, the traffic management computing device 12 can continue to receive network traffic in step 302 while any of steps 304-312 is performed. Additionally, the exemplary method illustrated in FIG. 4 can be performed in parallel for multiple sets of enforced and staged firewall policies associated with various logical firewalls corresponding to different contexts.

By applying the enforced and staged policies to the same network traffic in a live environment, but not executing any actions with respect to the staged firewall policy, a firewall administrator user of the firewall administrator device 22 can more effectively validate the staged firewall policy prior to deploying it on the traffic management computing device 12 as an enforced firewall policy. Thereby, firewall policy changes can be made without disrupting the user experience or requiring a rollback to a previously-enforced policy.

Figure 5:
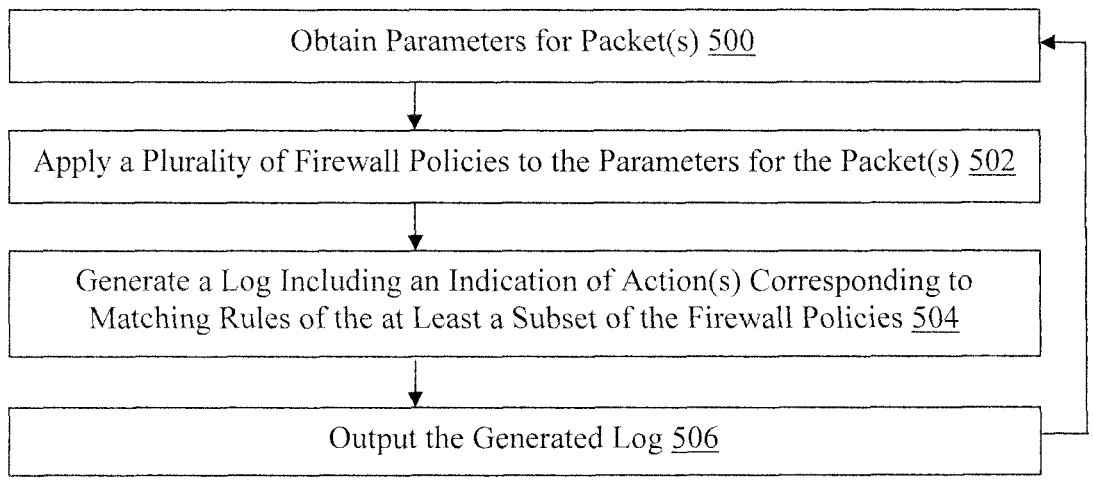
FIG. 5 is a flowchart of an exemplary method for testing and validating firewall policies in a simulated environment.

Referring more specifically to FIG. 5, a flowchart of an exemplary method for testing and validating firewall policies in a simulated environment is illustrated. In step 500 in this example, the traffic management computing device 12 obtains parameter(s) for packet(s). As mentioned earlier in connection with testing and validating firewall policies in a live environment, the parameter(s) can be the source and destination IP addresses, source and destination port numbers, an indication of an associated protocol, and/or an indication of a source virtual LAN, for example, although other parameters can also be used. In one example, the parameter(s) are obtained by the traffic management computing device 12 by parsing a network trace, a log file, or another file including packet parameters.

In another example, the parameter(s) can be input by a user of the firewall administrator device 22 through a provided interface. For example, the interface can be a graphical user interface (GUI) including a display of a workspace that includes fields for manual input of various packet parameters by an administrator. The administrator can then relatively easily observe and interpret the behavior of various firewall policies with respect to the input packet parameters, as described and illustrated in more detail later. Other methods of obtaining parameter(s) for packet(s) can also be used.

In step 502, the traffic management computing device 12 applies one or more firewall policies to the parameter(s) for the packet(s) in a simulated environment. In this example, the firewall policies each correspond to a logical firewall associated with one of a plurality of contexts. The policies can be cloned versions of firewall policies that are deployed and enforced on the traffic management computing device 12 and/or staged or candidate policies that a firewall administrator user of the firewall administrator device 22 would like to test for deployment as an enforced firewall policy, for example, although any other types of firewall policies can also be used. In one example, the traffic management computing device 12 applies the one or more firewall policies in response to an interaction by an administrator with a button included in the workspace provided in step 500.

In step 504, the traffic management computing device 12 generates a policy log including at least an indication of one or more actions and a corresponding rule of each of the firewall policies. The rule of each of the policies is a first rule in an access list of each of the policies matching one or more of the parameter(s) obtained in step 500 for each of the packet(s). Accordingly, the policy log includes an indication of each of the actions that would be taken in a live environment for each firewall policy for each of the packet(s) for which parameter(s) were obtained in step 500. Accordingly, the policy log is generated during the application of the plurality of firewall policies in step 502, and steps 502 and 504 can optionally be performed in parallel.

Optionally, the traffic management computing device 12 also maintains a hit count for each of the rules in the access lists of the policies to which the obtained parameter(s) were compared during the application of the policies in step 502. In this example, during the application of each of the firewall policies, the access list for each policy is traversed in order and each rule is compared to the obtained parameter(s) for each of the packet(s) to identify a match. Accordingly, the hit count value for a rule can be incremented each time the rule is determined to be a match for parameter(s) of one of the packet(s). The hit count values for each rule are optionally included in the generated policy log or are otherwise stored by the traffic management computing device 12 in the memory 28.

In step 506, the traffic management computing device 12 outputs the generated policy log, such as to the firewall administrator device 22, for example. The policy log can be output by the traffic management computing device 12 via an interface provided in response to a request received from a user of the firewall administrator device 22 or the policy log can be output automatically subsequent to the policy log being generated by the traffic management computing device 12.

In one example, the policy log is output through a graphical user interface (GUI) allowing a firewall administrator user of the firewall administrator device 22 to visualize the flow of the packet(s) through the firewall policies associated with a plurality of logical firewalls of the traffic management computing device 12. The visualization can include an indication of a path of the packet(s) through the plurality of firewall policies as determined based on the one or more actions taken with respect to each of the policies according to matching access list rules. Accordingly, the visualization can show an administrator the decision (e.g., accept or deny) taken at each enforcement point in a multi-layer firewall.

Accordingly, with the output policy log, a firewall administrator can determine whether the firewall policies to which the packet parameter(s) were applied in step 502 are valid and ready to be deployed in a live environment. In another example, a firewall administrator can troubleshoot an issue experienced by a user of one of the client computing devices 14(1)-14(n), for example. In this example, cloned versions of deployed firewall policies can be applied, in a simulated environment, to parameter(s) of packet(s) received from the one of the client computing devices 14(1)-14(n) associated with the user. A firewall administrator can then review the policy log output based on the application of the policies and visually identify the action taken with respect to each of the policies and the rule associated with each of the actions. Based on this information, the firewall administrator can more effectively identify which action or rule resulted in the issue experienced by the user of the one of the client computing devices 14(1)-14(n) and that may require modification.

In yet another example, a firewall administrator can determine from an output policy log that includes the optional hit counts, whether a rule with a relatively low hit count but relatively high in the access list order, and therefore often applied, should be moved lower or removed from the access list for one of the firewall policies. Conversely, a firewall administrator can determine that it may be advantageous to move a rule with a relatively high hit count higher in the order so that it is compared earlier to the packet parameter(s). Accordingly, priority of access list rules for the firewall policies can be analyzed based on the hit count included in the output policy log in order to optimize the firewall policies. Other exemplary use cases and implementations of the exemplary method illustrated in FIG. 5 are also possible.

Based on the information obtained through the output policy log(s), an administrator can input, such as to the workspace provided in step 500 for example, one or more changes to the parameter(s) of the packets input to the simulation or one or more of the firewall policies applied to the packet parameter(s) during the simulation. Then, steps 502-506 can be repeated by the traffic management device, at the direction of the administrator through interaction with the interface, to thereby allow the administrator to further test the firewall and/or determine whether desired firewall functionality was achieved in view of the changes.

Accordingly, by this technology, firewall administrators can more effectively validate and test firewall policies to mitigate disruption in user experience and more quickly debug user issues. With this technology, staged policies can be applied in parallel with enforced policies in live environments and logs of the actions taken with respect to each policy can be compared to determine whether a staged firewall policy is valid and ready to be deployed as an enforced firewall policy. Additionally, firewall administrators can visualize the application of firewall policies in a simulated environment to defined packet parameters to determine whether the firewall policies provide desired functionality or to more effectively identify the source of an issue experienced by a user.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for testing a firewall, the method comprising:
applying, by the traffic management computing device, an enforced firewall policy and a staged firewall policy to one or more parameters for a received packet;
generating, by the traffic management computing device, a policy log for the staged firewall policy and another policy log for the enforced firewall policy based on a match of one or more of the parameters of the packet to one or more access list rules of the staged firewall policy and another one or more access list rules of the enforced firewall policy, respectively;
executing, by the traffic management computing device, the enforced firewall policy on the packet;
determining, by the traffic management computing device, when the staged firewall policy is valid based on a comparison of the policy log for the staged firewall policy to the another policy log for the enforced firewall policy; and
replacing, by the traffic management computing device, the enforced firewall policy with the staged firewall policy, when the determining indicates that the staged firewall policy is valid.

2. The method as set forth in claim 1, wherein the one or more parameters for the packet are obtained from one or more of a network trace, an input by an administrator via a provided interface, or a log file.

3. The method as set forth in claim 1, wherein the generated policy log is output as a visualization comprising an indication of a path of the at least one packet through the staged firewall policy.

4. The method as set forth in claim 1, further comprising:
providing, by the traffic management computing device, a graphical user interface comprising a workspace;
receiving, by the traffic management computing device and via the workspace, one or more changes to at least one of the parameters for the packet or the access list rules of the staged firewall policy; and
repeating, by the traffic management computing device, the applying, generating, and outputting in response to the received one or more changes.

5. The method as set forth in claim 1, further comprising generating, by the traffic management computing device, a hit count for the one or more access list rules of the staged firewall policy and another hit count for the another one or more access list rules of the enforced firewall policy.

6. The method as set forth in claim 1, further comprising:
cloning, by the traffic management computing device, the enforced firewall policy; and
modifying, by the traffic management computing device, the cloned enforced firewall policy based on one or more received changes to the enforced firewall policy to generate the staged firewall policy.

7. The method as set forth in claim 5, further comprising:
determining, by the traffic management computing device, when the staged firewall policy is valid based on a comparison of the hit count for the staged firewall policy and the another hit count for the enforced firewall policy.

8. A non-transitory computer readable medium having stored thereon instructions for testing a firewall comprising executable code which when executed by a processor, causes the processor to perform steps comprising:
applying an enforced firewall policy and a staged firewall policy to one or more parameters for a received packet;
generating a policy log for the staged firewall policy and another policy log for the enforced firewall policy based on a match of one or more of the parameters of the packet to one or more access list rules of the staged firewall policy and another one or more access list rules of the enforced firewall policy, respectively;
executing the enforced firewall policy on the packet;
determining when the staged firewall policy is valid based on a comparison of the policy log for the staged firewall policy to the another policy log for the enforced firewall policy; and
replacing the enforced firewall policy with the staged firewall policy, when the determining indicates that the staged firewall policy is valid.

9. The non-transitory computer readable medium as set forth in claim 8, wherein the one or more parameters for the packet are obtained from one or more of a network trace, an input by an administrator via a provided interface, or a log file.

10. The non-transitory computer readable medium as set forth in claim 8, wherein the generated policy log is output as a visualization comprising an indication of a path of the at least one packet through the staged firewall policy.

11. The non-transitory computer readable medium as set forth in claim 10, further having stored thereon instructions that when executed by the processor cause the processor to perform steps further comprising:
providing a graphical user interface comprising a workspace;
receiving, via the workspace, one or more changes to at least one of the parameters for the packet or the access list rules of the staged firewall policy; and
repeating the applying, generating, and outputting in response to the received one or more changes.

12. The non-transitory computer readable medium as set forth in claim 10, wherein the packet is a received packet, the at least a subset of the firewall policies comprises at least a staged firewall policy and an enforced firewall policy, the policy log comprises at least a staged policy log and an enforced policy log, and non-transitory computer readable medium further has stored thereon at least one additional instruction that when executed by the processor cause the processor to perform at least one additional step comprising generating a hit count for the one or more access list rules of the staged firewall policy and another hit count for the another one or more access list rules of the enforced firewall policy.

13. The non-transitory computer readable medium as set forth in claim 8, further having stored thereon instructions that when executed by the processor cause the processor to perform steps further comprising:
cloning the enforced firewall policy; and
modifying the cloned enforced firewall policy based on one or more received changes to the enforced firewall policy to generate the staged firewall policy.

14. The non-transitory computer readable medium as set forth in claim 12, further having stored thereon instructions that when executed by the processor cause the processor to perform steps further comprising:
determining when the staged firewall policy is valid based on a comparison of the hit count for the staged firewall policy and the another hit count for the enforced firewall policy.

15. A traffic management computing device, comprising a memory comprising programmed instructions stored in the memory, the memory coupled to a processor which is configured to be capable of executing the programmed instructions stored in the memory to:

apply an enforced firewall policy and a staged firewall policy to one or more parameters for a received packet;

generate a policy log for the staged firewall policy and another policy log for the enforced firewall policy based on a match of one or more of the parameters of the packet to one or more access list rules of the staged firewall policy and another one or more access list rules of the enforced firewall policy, respectively;

execute the enforced firewall policy on the packet;

determine when the staged firewall policy is valid based on a comparison of the policy log for the staged firewall policy to the another policy log for the enforced firewall policy; and replace the enforced firewall policy with the staged firewall policy, when the determining indicates that the staged firewall policy is valid.

16. The traffic management computing device as set forth in claim 15, wherein the one or more parameters for the packet are obtained from one or more of a network trace, an input by an administrator via a provided interface, or a log file.

17. The traffic management computing device as set forth in claim 15, wherein the generated policy log is output as a visualization comprising an indication of a path of the at least one packet through the staged firewall policy.

18. The traffic management computing device as set forth in claim 17, wherein the processor coupled to the memory is further configured to be capable of executing the programmed instructions stored in the memory to:

provide a graphical user interface comprising a workspace;

receive, via the workspace, one or more changes to at least one of the parameters for the packet or the access list rules of the staged firewall policy; and repeat the applying, generating, and outputting in response to the received one or more changes.

19. The traffic management computing device as set forth in claim 17, wherein the packet is a received packet, the at least a subset of the firewall policies comprises at least a staged firewall policy and an enforced firewall policy, the policy log comprises at least a staged policy log and an enforced policy log, and the processor coupled to the memory is further configured to be capable of executing the programmed instruction stored in the memory to generate a hit count for the one or more access list rules of the staged firewall policy and another hit count for the another one or more access list rules of the enforced firewall policy.

20. The traffic management computing device as set forth in claim 15, wherein the processor coupled to the memory is further configured to be capable of executing the programmed instructions stored in the memory to:

clone the enforced firewall policy; and modify the cloned enforced firewall policy based on one or more received changes to the enforced firewall policy to generate the staged firewall policy.

21. The traffic management computing device as set forth in claim 19, wherein the processor coupled to the memory is further configured to be capable of executing the programmed instructions stored in the memory to:

determine when the staged firewall policy is valid based on a comparison of the hit count for the staged firewall policy and the another hit count for the enforced firewall policy.

* * * * *